R. Prosser,
Pipe Coupling,
N°9,278. Patented Sept. 21, 1852

UNITED STATES PATENT OFFICE.

THOMAS PROSSER, OF NEW YORK, N. Y., ASSIGNEE OF RICHARD PROSSER, OF ENGLAND.

APPLICATION OF A FREE-JOINT TUBE IN CIRCUMSTANCES WHERE IT IS EXPOSED TO EXTERNAL PRESSURE.

Specification forming part of Letters Patent No. 9,278, dated September 21, 1852; antedated May 31, 1852.

*To all whom it may concern:*

Be it known that I, RICHARD PROSSER, of Birmingham, in England, have invented a new and improved description of metal tube for the purpose of applying to steam-boilers or other vessels requiring metal tubes to be applied within them; and I do hereby declare that the following is a full and exact description thereof.

The nature of my invention consists in the application of a new (because neither welded nor brazed) and improved (because with a better skin, and more economical as to cost) description of tube. This tube has what I call a "free joint,"—that is to say, a joint running parallel to the axis of the tube, having no principle of cohesion or adhesion in the joint itself, but depending on its tendency to close and to keep closed upon the set or spring given to it in the process of manufacture. This tube is therefore only calculated to sustain external pressure, and is not applicable to purposes requiring tubes to sustain internal pressure.

The methods which I have invented, adopted, and prefer, and which I intend to protect by future application for patent-right for the purpose of manufacturing these free-joint tubes, may be described in general terms, without prejudice to my rights as inventor thereof, to consist, first, in preparing a plate of metal of the proper width for a tube by means of circular shears; secondly, in rolling the plates in the ordinary manner of rolling boiler and other plates for the purpose of flattening them; and, thirdly, in preparing the edges of such plates, which I now denominate "platens," by planing them so that the edges will fit one to the other when the prepared platen is afterward turned up into a tubular form.

Figure 1:
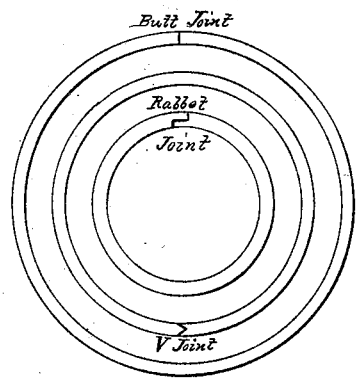

The machinery thus far proposed to be used is of the well-known and ordinary kind common in machine and other shops. The form of the joints is not material, as it may be a a V, a butt, or a rabbet joint, (all of which are represented in Fig. 1,) or any other that may be desirable and convenient; but for general purposes the V-joint appears preferable, and is shown in cross-section—that is to say, in section taken at right angles to the axis of the tube—in Fig. 1, being the middle tube of the three therein represented.

The method adopted in producing these tubes consists in taking the platens of metal prepared in manner as hereinbefore described, and pressing them into the hollows of suitable molds, so as to bend them by degrees to the required tubular form, as exhibited in Figs. 2, 3, 4, 5, 6, and 7, hereunto attached, and forming (with other figures) a part of this specification.

Figure 5:
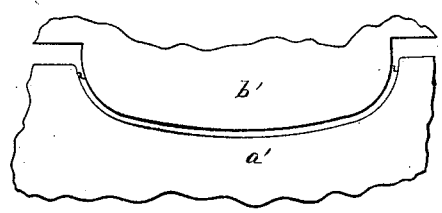
Figure 2:
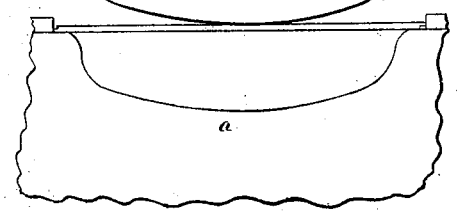

Fig. 2 exhibits the platen of metal placed over the hollow mold $a$, with the upper mold, $b$, above it, preparatory to the first bending operation, by which the platen of metal is forcibly pressed into the form of a gutter or trough, as shown in Fig. 5, where $a'$ represents the hollow mold, and $b'$ the solid upper tool or mold with the gutter-shaped metal between them in its first stage of bending.

Figure 3:
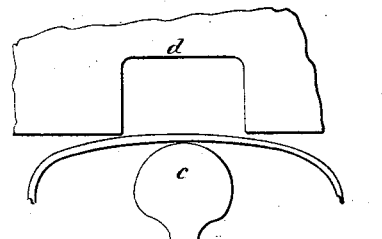
Figure 6:
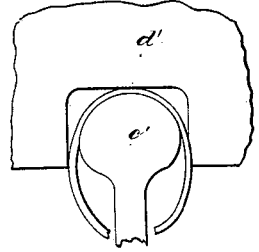

Fig. 3 shows the preparation for the second bending, where $c$ is the bottom solid tool or mold, and $d$ the hollow one placed above, while the trough-shaped metal is placed between them with its convex side uppermost, and which, on bringing the molds together by any forcible mechanical means, is pressed into the rectangular hollow above, and assumes the incomplete elliptical form shown in Fig. 6, wherein $c'$ is the solid bottom tool, and $d'$ the upper hollow mold.

Figure 4:
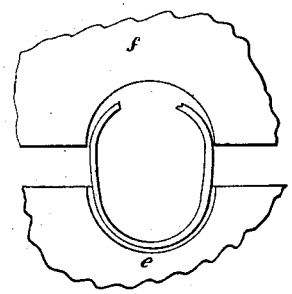
Figure 7:
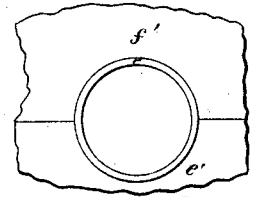

Fig. 4 is in like manner preparatory to the third and last bending, $e$ and $f$ representing semicircular molds, the one above and the other below, (with the bended metal plate between them,) and which on being forcibly pressed together, form a circle of the diameter that the tube is required to be, and thus completes the operation, as shown in Fig. 7, where $e'$ is the bottom and $f'$ the top mold, with the perfected tube within them.

These free-joint tubes, although principally applicable to or intended for steam-engine and other boilers wherein the smoke passes through the tube, and the pressure is consequently exerted upon the external surface thereof, are also applicable to many other purposes wherein a good joint not easily discernible is desirable and advantageous, yet owing to the absence of internal pressure absolute welding or brazing is not requisite. Nevertheless, these tubes may be made to resist internal pressure by the interposition of some suitable substance into the free-joint; but as this forms no part of my present invention, further remark is not deemed necessary.

What I claim as my invention, and desire to secure by Letters Patent, is—

The application of the improved metal tube made in the manner and for the purposes as hereinbefore described—that is to say, of a metal tube with a free joint, neither welded nor brazed—to boilers of steam-engines or other vessels requiring metal tubes of such a character as to resist external pressure effectually.

RICHARD PROSSER.

Witnesses:
T. H. S. HODGES,
EMANUEL WHARTON,
J. M. G. UNDERHILL,
*A Master Extr'oy in Chancery, U. S. Vice-Consul.*